United States Patent [19]

Feldman et al.

[11] 4,254,597
[45] Mar. 10, 1981

[54] SECTIONALIZED DRIVEN ROD

[75] Inventors: Gilbert J. Feldman; Richard A. Feldman, both of Tucson, Ariz.

[73] Assignee: Allied Surveyor Supplies Manufacturing Co., Tucson, Ariz.

[21] Appl. No.: 66,571

[22] Filed: Aug. 15, 1979

[51] Int. Cl.³ .......................... E04F 9/02; E02D 5/74
[52] U.S. Cl. ...................................... 52/103; 52/156; 175/323; 405/251
[58] Field of Search .................... 52/156, 157, 103; 405/251, 252, 250; 175/19, 323

[56] References Cited

U.S. PATENT DOCUMENTS

| 101,469 | 4/1870 | Tones | 175/19 |
|---|---|---|---|
| 1,894,401 | 1/1933 | Hollos | 52/156 |
| 1,894,446 | 1/1933 | McKenny | 173/112 |
| 2,343,350 | 3/1944 | Warren | 52/156 |
| 3,174,588 | 3/1965 | Kessler | 52/103 |
| 3,335,539 | 8/1967 | Soretz | 52/737 |
| 3,698,144 | 10/1972 | Stratton | 52/157 |
| 4,087,945 | 5/1978 | Berntsen | 52/103 |
| 4,137,686 | 2/1979 | Kern | 52/737 |

Primary Examiner—Price C. Faw, Jr.
Assistant Examiner—Henry E. Raduazo
Attorney, Agent, or Firm—LaValle D. Ptak

[57] ABSTRACT

A survey monument of the type adapted to be driven into the ground includes at least first and second elongated cylindrical rod sections. The two sections are connected together by a threaded connector turned into threaded bores at the upper end of the first rod section and the lower end of the second rod section. The lower end of the first rod section is terminated by a conical penetrating point and a pair of flukes, formed by stamping them out of the first rod section, are located intermediate this point and the upper end of the first rod section. These flukes are oriented with respect to the axis of the rod sections to cause the sections to rotate about their axis in a direction to tighten the threaded connection of the two rod sections as the sections are driven into the ground.

12 Claims, 6 Drawing Figures

SECTIONALIZED DRIVEN ROD

BACKGROUND OF THE INVENTION

Impact-driven conduit pipes and impact-driven survey monuments employing multiple interconnected sections are utilized when extensive distances must be traversed by such conduit pipes or survey monuments. Sectionalized, impact-driven survey monuments of the prior art may be typified by the survey monuments disclosed in the patents to Baumeister, U.S. Pat. No. 3,378,967, and Berntsen, No. 4,087,945. Similarly, sectionalized conduit driving mechanisms are found in the patents to McKenny, U.S. Pat. No. 1,894,446, and Marquiss, U.S. Pat. No. 1,210,187.

The Baumeister, Berntsen, and McKenney devices all are impact-driven mechamisms, while the Marquiss device is driven by means of a rachet jack mechanism. The devices of all of these patents employ sections of pipe or rods threaded together as they are driven vertically into the ground (as in the case of survey monuments) or horizontally under an area to be traversed (as in the case of the conduit driving devices). McKenney, Baumeister, and Marquiss all disclose external threads on hollow pipes and the use of conventional pipe couplers or, as in the case of Baumeister, the tube sections are inserted into one another by means of mating sleeve and socket extensions formed on opposite ends of each of the tube sections. In all of these devices, a penetrating tip is attached to the end of the first or forward marker or conduit section for penetration into the ground.

In the Marquiss device, a conical tip is threaded into the end section of the conduit to penetrate the ground and guide the remainder of the conduit sections as the sections are pushed by pressure of the jack through the ground. In Baumeister, a penetrating point is employed. In the McKenney and Berntsen devices, a similar penetrating point is threadedly attached to the end of the rod or pipe section entering the ground; and in both of these patents, the point has radially spaced, longitudinal, outwardly flared-barbs on the periphery of the point. These barbs additionally have a biassed turning surface to cause the points to rotate, along with the series of rods connected to the points, in a direction to tighten the threaded connections between the penetrating points and the rod section to which the points are attached, as well as to tighten the connections between all of the rods as the devices are driven into the ground.

The McKenney and Berntsen devices are substantially the same, except that in McKenny a hollow conduit is driven through the ground, whereas in Berntsen solid rods are driven into the ground. In the Berntsen device, a threaded connector is used to interconnect adjacent rod sections by threading the connector into threaded bores formed in the ends of each of the rod sections. This results in a smooth or uniform external surface of the interconnected rods. In McKenney an external pipe coupler is used to interconnect the sections.

Neither the Baumeister nor the Marquis devices rotate the rod sections, so that it is possible for the rod sections to loosen as the sections are driven into the ground. This is particularly true of the Baumeister device which is intended to be driven by a series of impacts or blows on the end remote from the penetrating point. The shock of these blows can loosen the interconnections. This is the reason the rotating points of the McKenny and Berntsen devices are employed. While the rotation imparted to the rod sections by the points of McKenny and Berntsen serves the purpose of maintaining the threaded connections screwed firmly together throughout the length of the pipe or rod, the use of a special separate point in both of these devices results in increased costs of the complete assembly. Furthermore by placing the outwardly flared barbs on the penetrating point itself, additional force is required to cause the penetration of the assembly into the ground. Also, the outwardly flared barbs can engage rocks or pebbles in the path of the marker or conduit and possibly deflect the true path desired for the monument or conduit as the assembly is driven through the ground.

Accordingly it is desirable to reduce the cost of rod sections of the general class described in the above patents and overcome the disadvantages of the McKenny and Berntsen devices caused by the specially constructed driving points, while retaining the advantages of rotating the rod sections in a manner to keep them tightly threaded together as the sections are driven into the ground.

SUMMARY OF THE INVENTION

Accordingly, it is an object of this invention to provide an improved sectionalized earth penetrating member.

It is an additional object of this invention to provide an improved sectionalized survey monument.

It is another object of this invention to provide an improved impact-driven sectionalized survey monument which rotates as it is driven into the ground.

It is further object of this invention to provide an improved impact-driven sectionalized survey monument with rotation imparting flukes on the lowermost section thereof for rotating the monument as it is driven into the ground to tighten and maintain tight threaded interconnections of adjacent sections.

In accordance with the preferred embodiment of this invention, a survey monument adapted to be driven into the ground has first and second elongated cylindrical rod sections. These sections are threadedly connected together in an end to end relationship, and the lower end of the first rod section is terminated by a penetrating point. The first rod section also has at least one fluke on its periphery between the penetrating point and the upper end of this section. This fluke is oriented with respect to the axis of the first rod section to cause the first rod section to rotate about its axis in a direction to tighten the threaded connection of the two rod sections as they are driven into the ground.

DETAILED DESCRIPTION

Figure 1:
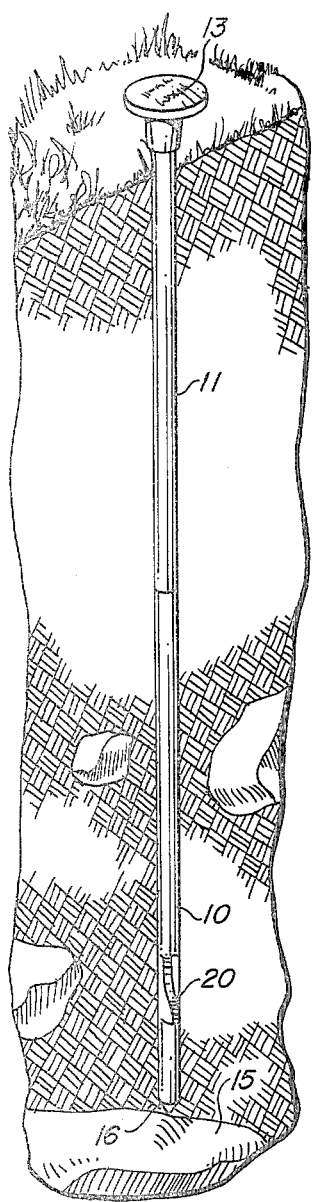
FIG. 1 is a perspective view of a survey monument in accordance with a preferred embodiment of the invention, shown in position in the ground.

Reference now should be made to the drawing where the same reference numbers are used throughout the different figures to refer to the same or similar parts. FIG. 1 illustrates a multiple section survey monument in place in the ground. The monument illustrated in FIG. 1 includes a lower section 10 and an upper section 11 which are threadedly fastened together to form the complete monument. The upper end of the upper section 11 is topped by a cap 13 which is tapped onto the top end of this section. The cap 13 is tapped onto the top end of the last rod section after the monument comprising of sections 10 and 11 (and other sections if necessary) encounters a point of refusal, such as the rock layer 15 shown in FIG. 1.

Figure 2:
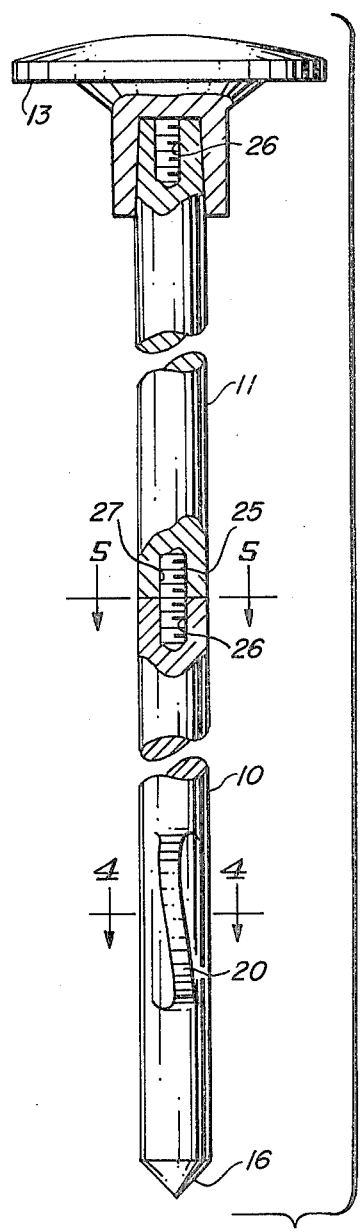
FIG. 2 is an exploded view of the survey monument shown in FIG. 1, with some parts shown in section.
Figure 3:
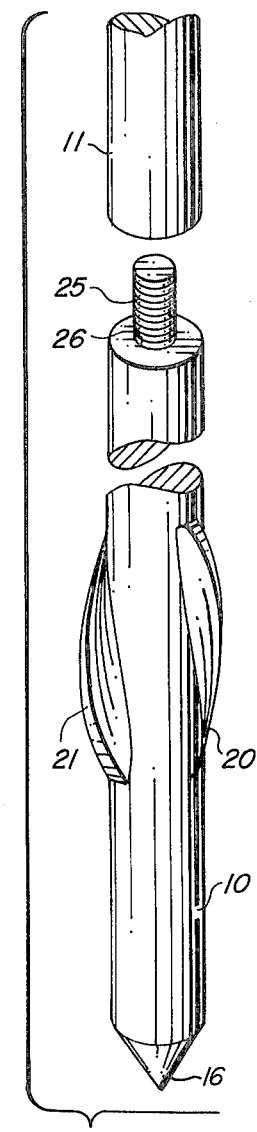
FIG. 3 is an exploded view of a portion of the survey monument shown in FIG. 2 to illustrate additional details thereof.
Figure 4:
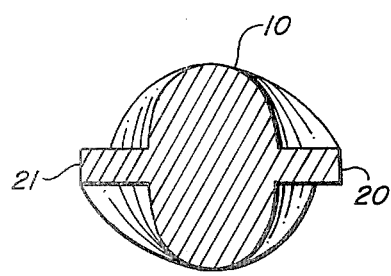
FIG. 4 is a cross sectional view taken along the line 4—4 of FIG. 2.
Figure 5:
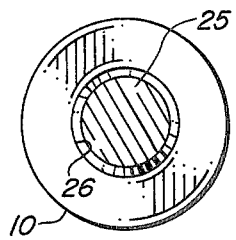
FIG. 5 is a cross sectional view taken along the line 5—5 of FIG. 2.
Figure 6:
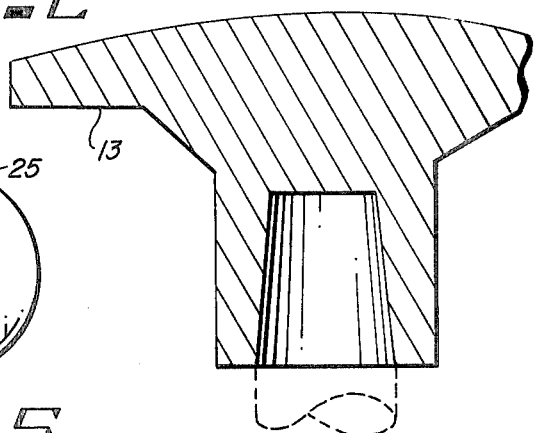
FIG. 6 shows additional details of a portion of the embodiment illustrated in FIGS. 1 and 2.

To facilitate the penetration of the monument into the ground, the lower end of the bottom section 10 is finished in the form of a conical penetrating point 16, which is shown most clearly in FIGS. 2 and 3. The point 16 assists in penetration of the monument into the ground and acts to guide the monument in a straight path as the monument is manually or mechanically pounded into the ground. To insure that the threaded connections between the sections 10 and 11 (and other sections if they are used) are kept tight, a pair of outwardly extending flukes 20 and 21 are formed on the opposite sides of the lowermost section 10 between the driving point 16 and its upper end. These flukes are spaced from the point 16 and located on the body portion of the section 10. The flukes 20 and 21 are located in planes which are at a slight angle with respect to the axis of the sections 10 and 11; and, as viewed from the cross sectional view shown in FIG. 4, are disposed in opposite directions. This causes a spiraling or twisting of the section 10 as the section 10 and subsequent sections attached to it are driven into the ground. The direction of rotation is such that the monument sections 10 and 11 are rotated about their longitudinal axis in a proper direction to keep the threaded connections between the various sections screwed firmly together throughout the length of the sections.

In addition, the rotation of the sectional monument assists the movement of the sections into the ground, making the driving operation easier than it would be without the rotation imparted by the flukes 20 and 21. The primary advantage provided by the flukes 20 and 21, however, is to keep the threaded joints tight throughout the driving operation. Without this tightening provided by the rotation, the various impulses which are transmitted longitudinally through the different sections as the sections are driven into the ground have a tendency to loosen the threaded joints between the sections. This then could result in wear or breaking of the threaded joints and a failure to properly transmit the impulses from the driving head through to the penetrating point 16.

The various sections are interconnected in the manner disclosed in the U.S. Trask Pat. No. 3,359,449, issued Dec. 19, 1967, by using separate threaded inserts 25. The inserts 25 in turn are turned into threaded bores 26 and 27 provided at the upper and lower ends, respectively, of all of the rod sections, with the exception of the lowermost rod section 10 which is terminated at its lower end by the penetrating point 16. The threaded inserts 25 and all of the bores 26 and 27 are threaded in the same direction; so that, by using an insert 25 at each joint to be made, a tight threaded connection of the type shown in the Trask patent can be effected. The bores 26 and 27 are made to have a combined length greater than the length of the threaded inserts 25, so that a tight end to end abutting connection between the upper end of a lower rod section (10 or 11) and the lower end of the next higher rod section 11 can be made.

As is most apparent in FIGS. 2 and 3, the ends of the rod sections 10 and 11 are flat to provide a tight joint. In addition, by using the flat ends, the impact from the blows of the hammer used to drive the sectionalized monument into the ground are effectively transmitted from upper sections to the lower sections through the section ends themselves with a maximum contact area. As many sections 11 as are necessary to reach the desired depth may be screwed onto the upper end of each of the next lower section until the point 16 reaches a point of refusal in the ground. If a portion of the upper section 11 then is sticking out of the ground, it can be cut off at the desired height. The cap 13, preferably is of the type disclosed in U.S. Pat. No. 3,174,588. As described in that patent, the cap fuses onto the upper end of section 11 onto which it is driven to make a permanent monument marker.

The marker rod sections 10 and 11 preferably are made of an aluminum-magnesium alloy; and a metallurgically compatible threaded insert 25 is utilized; so that no potential electrolysis or galvanic action occurs to deteriorate the insert 25 and the ends of the rod sections 10 and 11 interconnected by such inserts.

The flukes 20 and 21 are formed by stamping them directly out of the solid rod section 10 in a simple stamping press operation to reduce down the diameter of the rod section 10 in the area out of which the flukes 20 and 21 are formed. As is most apparent from an examination of FIG. 2, the surfaces of the flukes 20 and 21 lie in parallel planes, so that very simple tooling may be utilized in the press used to form the flukes 20 and 21. Also as is most evident from an examination of FIG. 2, the angle of these planes with respect to the plane passing through the axis of the sections 11 and 12 is very slight, on the order of 3 to 7 degrees. Consequently, the flukes 20 and 21 do not interfere with the downward passage of the section 10 into the ground but still impart one revolution every 20 to 40 inches of driven depth of the monument. Another advantage which is obtained from the flukes 20 and 21 is that the protrusion of these flukes outwardly from the diameter of the rod sections 10 and 11 provides resistance to withdrawal of the monument from the ground to prevent its removal.

The foregoing description, taken in conjunction with the embodiment shown in the drawings is to be considered illustrative of the invention only and not limiting. Various changes or modifications will occur to those skilled in the art without departing from the true scope of the invention.

We claim:
1. A survey monument adapted to be driven into the ground including in combination:
   at least first and second elongated cylindrical rod sections;
   means for threadedly connecting the upper end of said first rod section with the lower end of said second rod section in end-to-end relationship; and
   the lower end of said first rod section terminated by a penetrating point and having at least one fluke on the periphery of said first section, said fluke spaced a predetermined distance from said point and located between the upper end of said first rod sec- tion and said point, said fluke oriented with respect to the axis of said first rod section to cause said first rod section to rotate about its axis in a direction to tighten the threaded connection of said first and second rod sections as said sections are driven into the ground.

2. The combination according to claim 1 wherein at least first and second flukes are spaced equidistantly circumferencially about the periphery of said first rod section intermediate said point and the upper end of said first rod section.

3. The combination according to claim 2 wherein the point on the lower end of said first rod section is a conical point.

4. The combination according to claim 3 wherein each of said flukes have parallel surfaces lying in planes parallel to radii of said cylindrical rod sections and oriented at an angle to planes passing through the longitudinal axis of said rod sections.

5. The combination according to claim 2 wherein at least said first rod section is a solid cylinder where said flukes are located and wherein said flukes are formed by stamping them out of said first rod section.

6. The combination according to claim 5 wherein the point on the lower end of said first rod section is a conical point.

7. The combination according to claim 6 wherein said survey monument is comprised of a plurality of elongated cylindrical rod sections, each, with the exception of the lower end of said first rod section, having a longitudinal threaded bore in each of the ends thereof; and said means for threadedly connecting said rod sections in end-to-end relationship comprises threaded connectors turned into the threaded bores of the adjacent ends of pairs of said rod sections for connecting such sections in aligned relationship with a uniform external cross section throughout the length except for the protrusion of said flukes from the periphery of said first rod section.

8. The combination according to claim 7 wherein each of said flukes have parallel surfaces lying in planes parallel to radii of said cylindrical rod sections and oriented at an angle to planes passing through the longitudinal axis of said rod sections.

9. The combination according to claim 1 wherein said first rod section is a solid cylinder at least where said fluke is located; and wherein said fluke is formed by stamping it out of said first rod section.

10. The combination according to claim 9 wherein at least first and second flukes are located on the periphery of said first rod section, said flukes being equiangularly spaced from one another about the circumference of said first rod section; and at least the portion of said first rod section where said flukes are located being a solid cylinder, with said flukes being formed by stamping them out of said first rod section.

11. The combination according to claim 1 wherein said survey monument is comprised of a plurality of elongated cylindrical rod sections, each, with the exception of the lower end of said first rod section, having a longitudinal threaded bore in each of the ends thereof; and said means for threadedly connecting said rod sections in end-to-end relationship comprises threaded connectors turned into the threaded bores of the adjacent ends of pairs of said rod sections for connecting such sections in aligned relationship with a uniform external cross section throughout the length except for the protrusion of said fluke from the periphery of said first rod section.

12. The combination according to claim 11 wherein said fluke has parallel surfaces lying in planes parallel to radii of said cylindrical rod sections and oriented at an angle to planes passing through the longitudinal axis of said rod sections.

* * * * *